US012202114B2

(12) United States Patent
Patterson

(10) Patent No.: US 12,202,114 B2
(45) Date of Patent: Jan. 21, 2025

(54) MULTI-USE HAMMER DEVICE AND METHOD

(71) Applicant: Anerob, LLC, Missoula, MT (US)

(72) Inventor: RJ Patterson, Florence, MT (US)

(73) Assignee: Anerob, LLC, Missoula, MT (US)

( * ) Notice: Subject to any disclaimer, the term of this patent is extended or adjusted under 35 U.S.C. 154(b) by 545 days.

(21) Appl. No.: 17/355,838

(22) Filed: Jun. 23, 2021

(65) Prior Publication Data

US 2021/0331303 A1 Oct. 28, 2021

Related U.S. Application Data

(63) Continuation of application No. 14/143,313, filed on Dec. 30, 2013, now Pat. No. 11,072,059.

(51) Int. Cl.

| | |
|---|---|
| ***B25D 1/16*** | (2006.01) |
| ***B25B 19/00*** | (2006.01) |
| ***B25D 1/02*** | (2006.01) |
| ***B25D 1/12*** | (2006.01) |

(52) U.S. Cl.

CPC ................ *B25D 1/16* (2013.01); *B25B 19/00* (2013.01); *B25D 1/02* (2013.01); *B25D 1/12* (2013.01); *B25D 2250/171* (2013.01); *B25D 2250/371* (2013.01)

(58) Field of Classification Search

CPC .... B25D 1/16; B25D 1/12; B25D 1/02; B25B 19/00; B25B 2250/171; B25B 2250/371

USPC ........................................................ 81/25, 27

See application file for complete search history.

(56) References Cited

U.S. PATENT DOCUMENTS

| | | | | |
|---|---|---|---|---|
| 2,701,359 A | | 2/1955 | Asbury | |
| 3,519,087 A | | 7/1970 | Silvio | |
| 4,241,795 A | | 12/1980 | Landry | |
| 4,316,513 A | | 2/1982 | Harris | |
| 5,075,947 A | | 12/1991 | Jessup | |
| 5,090,102 A | | 2/1992 | Lovell | |
| 5,370,192 A | | 12/1994 | Evinger | |
| 5,878,822 A | * | 3/1999 | Roy | B27L 7/005 173/132 |

(Continued)

FOREIGN PATENT DOCUMENTS

CA 2298026 A1 5/2000

OTHER PUBLICATIONS

International Search Report and Written Opinion for International (PCT) Patent Application No. PCT/US14/72564, mailed Mar. 20, 2015 (7066-7-PCT), 10 paQes.

(Continued)

*Primary Examiner* — Hadi Shakeri

(74) *Attorney, Agent, or Firm* — Berg Hill Greenleaf Ruscitti LLP

(57) ABSTRACT

A slide and pull hammer device includes three major components, namely, a guide sleeve, a drive bar and an impact head. The drive bar is inserted within the guide sleeve. The impact head is secured within the distal end of the guide sleeve, and has a portion which protrudes beyond the guide sleeve distal end. The drive bar is operable to impact both a distal end and a proximal end of the guide sleeve to apply force to objects in at least two opposite force directions. One force applied by the device includes a hammering or compression force, and another force applied by the device includes a tension or withdrawing force.

7 Claims, 6 Drawing Sheets

(56) References Cited

U.S. PATENT DOCUMENTS

| | | | |
|---|---|---|---|
| 6,125,719 A | 10/2000 | Lowther et al. | |
| 6,349,618 B1 | 2/2002 | Lowther | |
| 6,402,007 B1 | 6/2002 | Dyer | |
| 6,474,198 B2 | 11/2002 | Lowther | |
| 6,978,527 B2 | 12/2005 | Oser | |
| 7,191,685 B2 | 3/2007 | Lowther | |
| 9,493,917 B2 * | 11/2016 | Lesche | E01C 19/32 |
| 9,878,431 B2 * | 1/2018 | Herr | A62B 3/005 |
| 11,034,009 B2 * | 6/2021 | Rolof | B25D 1/16 |
| 11,059,157 B2 * | 7/2021 | Fu | B25F 1/006 |
| 11,072,059 B2 | 7/2021 | Patterson | |
| 2004/0143950 A1 | 7/2004 | Antoniades | |

OTHER PUBLICATIONS https://www.youtube.com/watch?v=tHtk1 hlVwbw , “Slide Sledge”, uploaded Aug. 30, 2007.

* cited by examiner

MULTI-USE HAMMER DEVICE AND METHOD

CROSS REFERENCES TO RELATED APPLICATION

This application is a continuation of U.S. application Ser. No. 14/143,313, filed Dec. 30, 2013; the entire disclosure of which is hereby incorporated by reference.

FIELD OF THE INVENTION

This invention relates to a device that transfers the force of an impact to a targeted object and, more particularly, to a slide hammer that transfers the force of an impact to a targeted object, the force including either a hammering or compression force, or a tension or withdrawal force, depending upon the method in which the slide hammer is operated.

BACKGROUND OF THE INVENTION

It is known to use various combinations of chisels and hammers in order to impart a force upon a targeted object. In the automotive repair industry, it is often necessary to reshape and straighten vehicle body frames that have been damaged. Various forms of frame straightening machines are available for such purposes. However, even with the availability of such machines, it is still necessary in most cases to apply manual force to the frame in order to achieve the exact type of reshaping necessary to straighten the frame. Particularly for hard-to-reach locations on the vehicle frame, pneumatic or hydraulic machines are simply not able to be positioned in a manner to provide the necessary directed force against a targeted frame location. Also, for intricate reshaping of smaller frame members, machines are unsuitable. Thus, the straightening of a vehicle body frame still requires a considerable amount of manual labor.

One disadvantage of using a hammer and chisel is that the hammer and chisel have to be firmly gripped, and when metal to metal contact is made between the frame and the chisel, most of the force of the impact is transmitted back through the user's hands and arms. This force transmitted back through the hands and arms of a person can cause great pain and discomfort, as well as to cause premature fatigue. Because the hammer has to be swung with such great force, the hammer itself can become a danger, particularly in hammering out hard-to-reach locations on the frame. These and other known hazards make the use of a chisel and hammer undesirable.

Therefore, a need exists for a device which can be safely and easily manipulated by a user for applying a desired amount of force to a targeted object. A need also exists for a hammering device that allows a user to vary the amount of force applied by the device without having to substantially change the user's physical efforts in manipulating the device.

Examples of prior art slide hammer devices include the U.S. Pat. Nos. 6,125,719; 6,474,198; and 6,349,618.

General objects of the invention include providing a slide hammer device capable of transferring the force of an impact to a specific targeted object, a device that minimizes the reaction force transmitted back through the user's hands and arms, a device that has removable and varying end tip configurations in order to control the types of force applied to a targeted object. However, one additional object of the invention is to provide a device that not only has the capability to generate a hammering or compression force, but also a tension or withdrawal force to pull against a targeted object in order to dislodge or remove the targeted object. In this regard, the invention departs from common slide hammer devices in which only a hammering force can be generated. These objects and others will be explained more fully below as they apply to the slide hammer device of this invention.

SUMMARY OF THE INVENTION

In its simplest form, the slide hammer of this invention is a hammering device that enables the force of an impact to be transferred to a targeted object. The apparatus has three major components, namely, a guide sleeve, a plunger or drive bar, and an impact head. The plunger is inserted within the guide sleeve. The impact head is secured within the distal end of the guide sleeve, and has a portion that protrudes beyond the distal end of the guide sleeve. In one configuration, the impact head is able to freely slide within a specified portion of the guide sleeve distal end.

The plunger or drive bar is moved in a distal or forward direction within the guide sleeve to make contact with the portion of the impact head that communicates with the guide sleeve. The force of the plunger striking the impact head is transmitted through the impact head to a targeted object contacted by the impact head, such as a vehicle frame member. In another configuration, a spring can be used to dampen contact of the drive bar against the impact head.

The impact head may be fitted with various types of end tips. The particular end tip chosen is based upon the type of desired force to be applied against the targeted object. The exterior dimension of the plunger and the interior surface of the bore or passageway in the guide sleeve that receives the plunger are sized for a relatively close tolerance fit, which ensures a smooth sliding movement of the plunger within the guide sleeve.

A removable handle may be mounted to the guide sleeve in order to reduce the shock of the impact transmitted back through the user's hands and arms, and to allow the device to be more easily gripped during use.

Optionally, various sized weights may be added to the proximal end of the plunger in order to selectively adjust the amount of force transmitted from the plunger to the impact head. In this regard, one or more weights can be removably secured to the proximal plunger end, such as weights with threaded bores attached to a threaded proximal end of the plunger.

The use of the guide sleeve to guide the plunger greatly increases the accuracy at which a force is applied to a targeted object. Not only can the angle at which the force is applied be better controlled, but also the magnitude of the applied force as well. The guide sleeve acts as an alignment means for directing the force at a desired angle. Since the plunger travels along this aligned path, the angle at which the force is applied to a targeted object is very accurate. With a hammer and chisel, it is much more difficult to maintain this aligned path between the chisel axis and the angle at which the hammer strikes the chisel head; therefore, the angle at which force is applied to a targeted object is more inconsistent. In terms of force magnitude, the plunger may be slid within the guide sleeve at the appropriate velocity to increase or decrease the force transmitted through the impact head. The use of the guide sleeve in conjunction with the plunger also makes the application of force safer since there is no possibility that the plunger will become disengaged from or otherwise slip away from the impact head during impact. Since the plunger may be slid within the guide sleeve as opposed to being independently lifted or carried throughout a striking motion, the user must only overcome the slight friction between the guide sleeve and the plunger to move the plunger for contact with the impact head. The plunger may be lubricated as necessary to further reduce the amount of effort required to slide the plunger within the guide sleeve. The removable weights attached to the plunger can allow one to further vary the force applied. Additionally, the guide sleeve and plunger may be made longer or shorter depending upon the particular application and the amount of force to be applied to the targeted object. Because the impact head may be fitted with removable tips, the slide hammer is adaptable for use in many applications.

The impact head according to a preferred embodiment is housed within an impact head receiving section located at the distal end of the guide sleeve. The impact head receiving section may be removable from the guide sleeve which allows the impact head receiving section to be replaced with different sized impact heads. For example, the impact head receiving section may be threadably attached to the distal end of the guide sleeve. A removable impact head receiving section allows replacement of this section which undergoes greatest stress and strain during use, and therefore, potential damage over time.

A spring may be placed within the impact head receiving section to dampen contact between the plunger and the impact head, or alternatively, no spring may be used that allows the impact head to freely slide within the impact head receiving section. The advantage of using a spring within the impact head receiving section is that it helps stabilize the impact head prior to impact with the plunger; however, a disadvantage is that the force of the distal end of the plunger against the impact head is dampened thereby reducing transfer of force from the plunger to the impact head.

The use of the slide hammer of the present invention results in less force being transmitted back through the hands and arms of a user. When the plunger achieves the desired velocity within the guide sleeve, the user's hands need not be gripped so tightly around the proximal end of the plunger (as compared to a hammer and chisel) which, in turn, reduces the amount of force transmitted back through that hands and arms of the user. As discussed above with respect to a hammer and chisel, the hammer must always be tightly gripped during impact against the chisel which, in turn, results in much greater force being transmitted back through the hands and arms. Also, since the impact head is able to slide along a specified length within the guide sleeve, the guide sleeve itself may recoil and absorb retransmitted impact forces that further reduce the shock experienced by the user's hands and arms. In general, the sliding engagement of the impact head and the plunger within the guide sleeve combines to enhance the shock absorption characteristics of the slide hammer.

Since the impact head is able to slide with minimal resistance within the specified portion of the guide sleeve, the full impact of the moving plunger may be transmitted to the impact head which, in turn, helps to ensure that an adequate force is applied to the targeted object.

It is yet another object of the present invention to provide a slide hammer device that is operable in at least two modes or methods wherein one mode or method comprises imparting a force by driving or pressing a component in a first forward or distal direction, and a second mode or method comprises pulling or withdrawing a component in a second reverse or proximal direction. In such embodiments, a slide hammer device is provided that is adapted to impart a hammering or compression force as well as a tension or extraction force in a substantially opposite direction as the hammering/compression force. For use of the invention for purposes of transferring a tension or extraction force against a targeted object, the slide hammer incorporates a stop or delimiting member secured at the proximal end of the guide sleeve to prevent the drive bar from being completely withdrawn from within the guide sleeve. When the drive bar is withdrawn a sufficient distance, a surface of an enlarged drive bar end located at the distal end of the drive bar makes contact with the stop. The force generated with this contact results in generating the tension or extraction force.

Various end tips or end members are contemplated for use in which the end tips are secured to the protruding distal end of the impact head. The end tips can be sized and shaped for purposes of generating the desired types of hammering or tension/extraction forces to be applied to targeted objects.

Considering the above described features of the invention, in one aspect, the invention can be considered as a slide hammer comprising: (i) a guide sleeve having a distal end and a proximal end, and an inner surface defining a longitudinal passageway therein, the guide sleeve further comprising a first delimiting member located at the distal end and a second delimiting member located at the proximal end; (ii) an impact head secured to the distal end of the guide sleeve; (iii) a drive bar slidably secured within the longitudinal passageway of the guide sleeve, the drive bar comprising a proximal end, a distal end, and a predetermined length there between, the proximal end comprising an extension which extends beyond the proximal end of said guide sleeve; and wherein contact between the impact head and the first delimiting member defines a position of maximum insertion of the drive bar within the guide sleeve and contact between the impact head and the second delimiting member defines a maximum withdrawn position of the drive bar from within the guide sleeve.

In another aspect of the invention, it may be considered a slide hammer comprising: (i) a guide sleeve having a distal end and a proximal end, and an inner surface defining a longitudinal passageway therein; (ii) a substantially cylindrical drive bar slidably received within the longitudinal passageway and in force transmitting communication with the guide sleeve, the drive bar comprising a first end, a second end, and a predetermined length there between; (iii) an impact head in communication with the distal end of the guide sleeve; (iv) the second end of the drive bar comprising an enlarged cylinder of greater diameter than the substantially cylindrical drive bar and which remains within said longitudinal passageway; (v) the first end of the drive bar comprising an extension which extends beyond the proximal end of said guide sleeve; (vi) a first delimiting member located at the distal end of the guide sleeve; (vii) a second delimiting member located at the proximal end of the guide sleeve; and wherein contact between the impact head and the first delimiting member defines a position of maximum insertion of the drive bar within the guide sleeve and contact between the enlarged cylinder and the second delimiting member defines a maximum retracted position of the drive bar from within the guide sleeve.

In yet another aspect of the invention, it may be considered a method of generating a tension force by a slide hammer device against a targeted object, comprising: (a) providing a slide hammer device including: (i) a guide sleeve having a distal end and a proximal end, and an inner surface defining a longitudinal passageway therein, the guide sleeve further comprising a first delimiting member located at the distal end and a second delimiting member located at the proximal end; (ii) an impact head secured to the distal end of the guide sleeve; (iii) a drive bar slidably secured within the longitudinal passageway of the guide sleeve, the drive bar comprising a proximal end and a distal end, the proximal end comprising an extension which extends beyond the proximal end of said guide sleeve for grasping by a user, and the distal end comprising an enlarged portion; (iv) providing an end tip secured to a distal end of the impact head; (b) securing the end tip to a targeted object upon which the tension force is to be applied by the slide hammer device; and (c) sliding the drive bar within the guide sleeve in a rearward or proximal direction so that the enlarged portion of the drive bar contacts the second delimiting member, and wherein contact between the enlarged portion of the drive bar against the second delimiting member generates a tension force against the targeted object.

These and other advantages will be apparent from the disclosure of the embodiments contained herein.

BRIEF DESCRIPTION OF THE DRAWINGS

The accompanying drawings, which are incorporated in and constitute part of the specification, illustrate embodiments and together with the general description given above and the detailed description of the drawings given below, serve to explain the principle of some of the possible embodiments.

Figure 1:
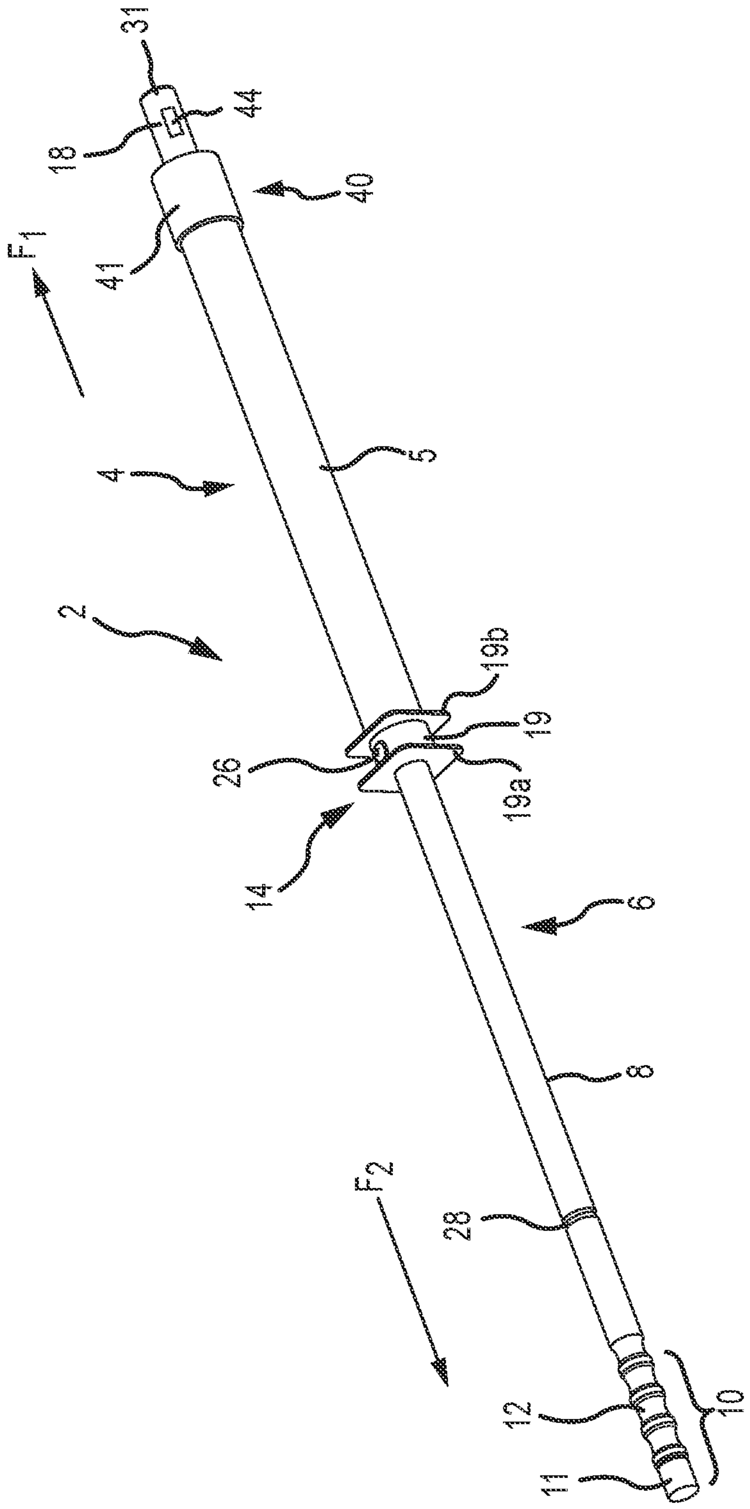
FIG. 1 is a perspective view of a preferred embodiment of a slide hammer device.

It should be understood that the drawings are not necessarily to scale. In certain instances, details that are not necessary for an understanding of the embodiments or that render other details difficult to perceive may have been omitted from these drawings. It should be understood, of course, that the embodiments are not limited to those particular embodiments illustrated in the drawings.

DETAILED DESCRIPTION

Figure 2:
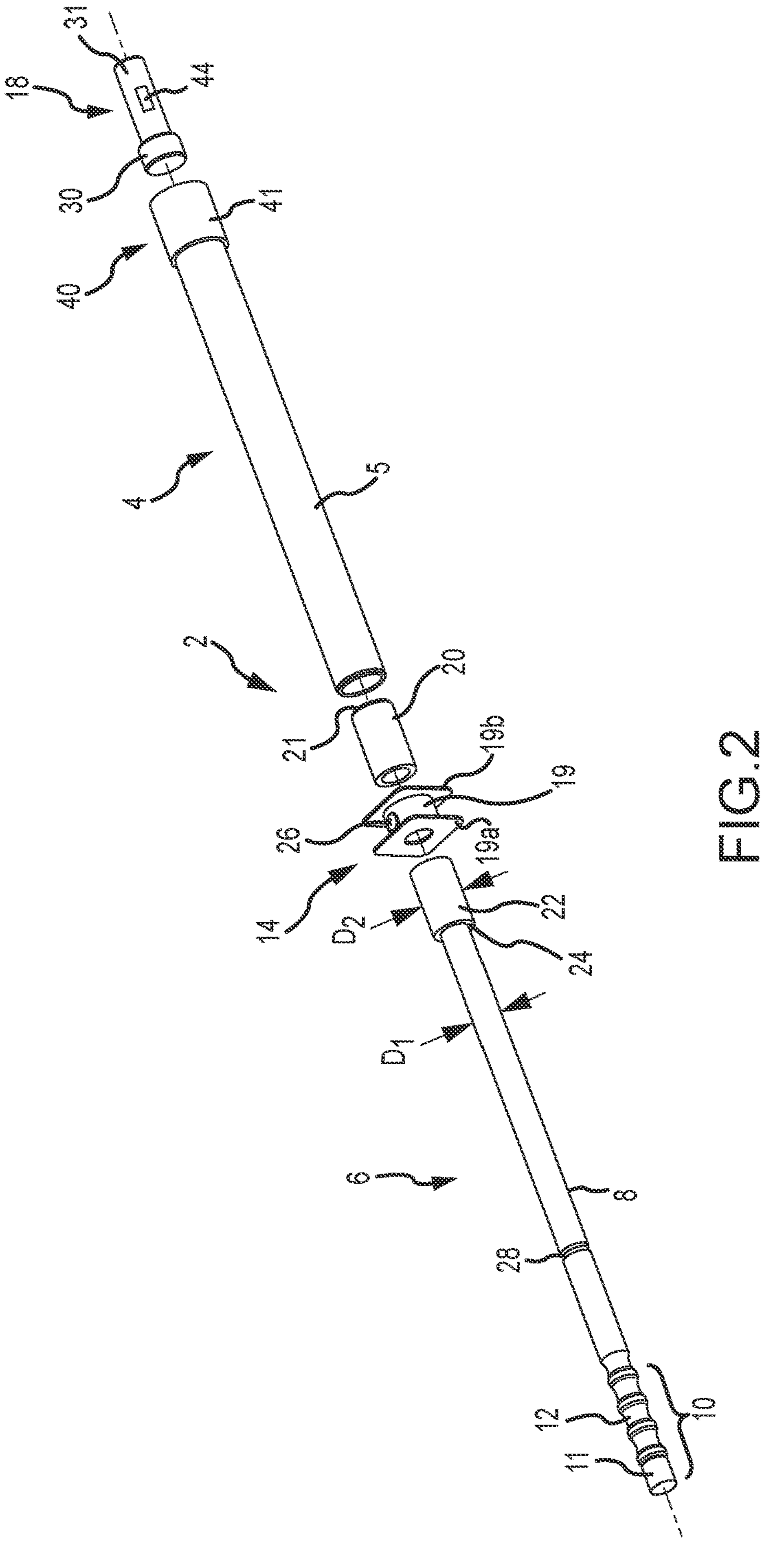
FIG. 2 is an exploded view of the embodiment of FIG. 1.
Figure 3:
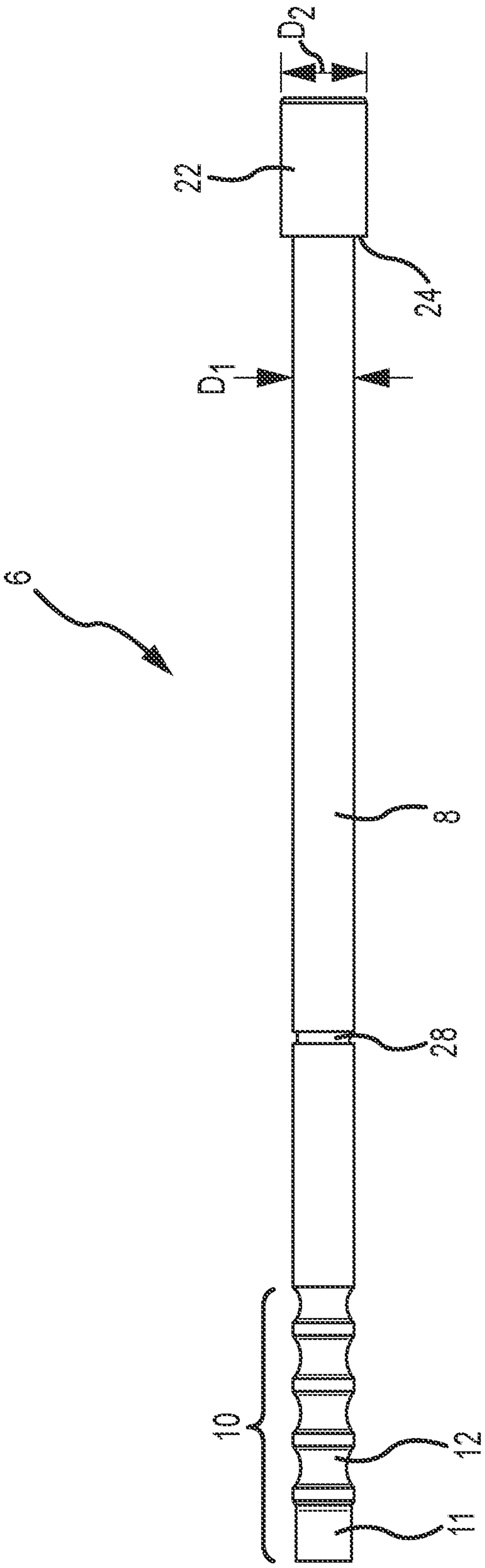
FIG. 3 is a an enlarged side view of a plunger according to the embodiment of FIG. 1.

FIGS. 1-3 illustrate a slide hammer device according to a preferred embodiment of the invention. The slide hammer 2 comprises a guide sleeve 4 and a drive bar or plunger 6. In operation, the drive bar 6 is placed within the guide sleeve 4 and is slidable within at least a portion of a length of the guide sleeve 4. In the depicted embodiment, the drive bar 6 comprises a substantially cylindrical shaft portion 8, a user proximal portion 10, and an enlarged drive bar end 22. User portion 10 is grasped by the user, and may include features to enhance gripping, such as a hand-grip portion 12 and/or a knurled end portion. Other features placed on the user proximal portion 10 to enhance gripping for safety and functionality of the device 2 may include rubber grips or covers, enlarged and/or detachable handle portions, and finger or hand guard portions. When the device 2 is to be used as a pull hammer to generate tension/withdrawal forces, a flanged or bulbous feature may be threaded onto or otherwise secured to the proximal end 11 of the drive bar to aid a user's grip when a pulling or extraction motion is applied to the drive bar.

The slide hammer of the present invention is useful for transmitting at least one of two directional and controlled magnitude forces. As shown in FIG. 1, the translatable plunger or drive bar 6 is capable of being driven forward in the direction of resultant force $F_1$ in order to provide a forward or compression force against a targeted object. The device 2 is further capable of applying a second force $F_2$, wherein the second force $F_2$ is directed in a substantially opposite direction from the first force $F_1$. For example, an extraction force $F_2$ is imparted by translating the drive bar 6 in the direction of second force $F_2$. For transferring the tension or extraction force against a targeted object according to $F_2$, the slide hammer incorporates a proximal stop or delimiting member 20 secured at the proximal end of the guide sleeve 4 to prevent the drive bar 6 from being completely withdrawn from within the guide sleeve. When the drive bar is withdrawn a sufficient distance, a surface or shelf 24 of an enlarged drive bar end 22 at the distal end of the drive bar makes contact with the proximal stop 20, as discussed below. The force generated by this contact results in generating the tension/extraction force.

Various end tips may be secured to the impact head 18 in order to transfer force according to $F_1$ and/or $F_2$. For example, the end tips may include different shaped and sized tools that are each adapted for transferring force in a particular directed manner.

The guide sleeve 4 comprises an elongate cylindrical portion 5 and a hand guard feature 14 located at the proximal end of the guide sleeve. The guide sleeve 4 further comprises various internal geometries and features as shown and described in more detail herein. The impact head 18 is located at the distal or working end of the guide sleeve 4. An impact head receiving section 40 includes a housing 41 houses the proximal portion of the impact head 18. The impact head 18 transfers force from the plunger or drive bar 6 to a selected end tip secured to the distal end 31 of the of the impact head 18. Each end tip may have a proximal end threadably attached to a threaded distal end of the impact head 18, or the tools may be secured to the impact head by other means such as by a retaining pin or by friction fit.

The hand guard 14 of the guide sleeve may incorporate a spring loaded locking feature 26 for securing the drive bar 6 to thereby prevent it from moving within the guide sleeve, such as when the drive bar is not in use. The drive bar 6 has a corresponding annular recess 28 for receiving the locking feature 26.

As shown, the drive bar 6 includes the user-proximal portion 10 with the handle-grip portion 12, the elongate shaft 8, and the enlarged drive bar end 22. The enlarged drive bar end 22 is substantially cylindrical having an outer diameter greater than an outer diameter of the elongate shaft 8, and adapted for contacting the impact head 18 when the drive bar 6 is moved forward.

The proximal stop 20 may be press fitted, welded, or a combination thereof within the proximal end of the guide sleeve 4. The proximal stop may be cylindrical shaped ring or bushing piece sized to frictionally fit within the guide sleeve 4. During use, the forward or distal edge 21 of the stop 20 has a contact surface that makes contact with a shelf or surface 24 of the enlarged drive bar end 22 when the drive bar 6 is sufficiently withdrawn from the guide sleeve. More specifically, a withdrawal force $F_2$ is applied to the device 2 such that an end tip may pull, extract, or withdraw an object to which it is attached when the drive bar is withdrawn so that the shelf 24 strikes the forward edge 21 of the stop 20.

The hand guard portion 14 includes a first planar portion 19*a*, a second planar portion 19*b*, and a cylindrical portion 19 located between the planar portions. The locking feature 26 may be a biased locking pin that engages the recess 28 in the shaft 8. More particularly, when the recess 28 on the shaft 8 is moved into alignment with the lock pin 26, the lock pin can be selectively released so that the free end of the pin extends into and is secured within the recess 28. In this manner, the drive bar 6 is locked and is prevented from being moved within the guide sleeve until the lock pin 26 is extracted from the recess 28.

The impact head 18 may include a leaf spring 44 adapted for securing an end tip. The leaf spring may in the form of a strip of metal that bows radially outward, and is adapted to flexibly receive and engage an interior channel or bore of an end tip. The distal end of the impact head 18 may also have a through-hole for receiving and securing an end tip to the impact head as by a retaining pin placed through the through-holes and aligned with a corresponding through hole of the end tip.

Figure 4:
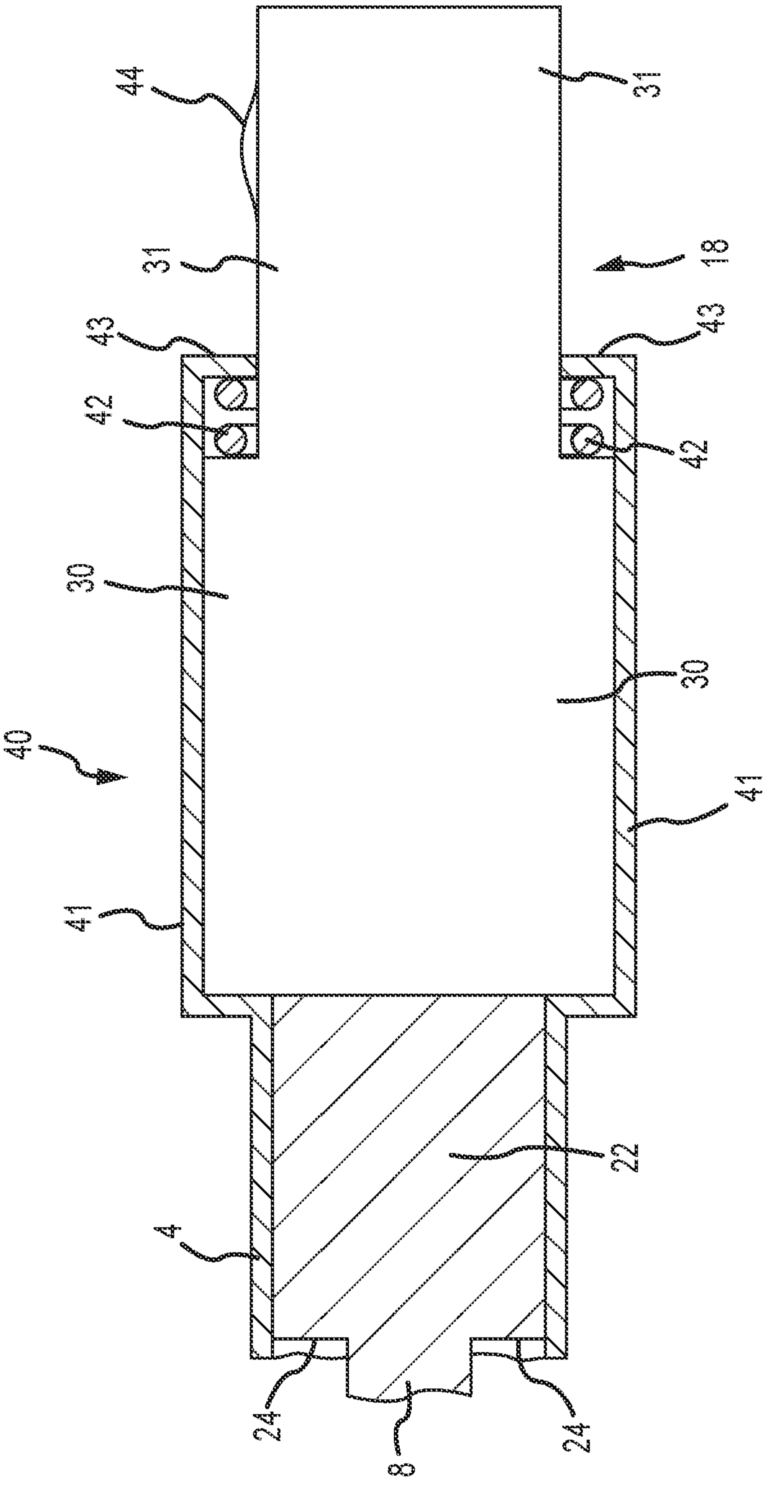
FIG. 4 is an enlarged cross-sectional view of a distal end of the embodiment of FIG. 1 showing details of a distal end of the plunger within the guide sleeve and located adjacent the impact head disposed within an impact head housing of the guide sleeve.

Referring also to FIG. 4, the impact head 18 comprises an impact flange 30 mounted within the housing 41 of the impact head receiving section 40. The impact flange 30 provides a force-communicating interface between the impact head 18 and an end tip mounted to the protruding distal end 31 of the impact head 18 when the device is used in a first mode to transmit force according to force $F_1$. The distal end of the impact head receiving section 40 includes a distal stop or delimiting member, shown in the preferred embodiment as an inwardly extending annular feature 43 that is smaller in diameter than the impact flange 30, thus preventing forward movement of the impact flange 30 beyond the stop 43. The enlarged drive bar end 22 within the guide sleeve 4 is shown as being in contact with a proximal facing surface of the impact flange 30. The distal end 31 of the impact flange 30 extends outwardly through the impact head housing 40. This distal portion is adapted to receive selected end tips. Spring 42 is shown as being located between the distal end of the impact flange 30 and the stop 43. The spring 42 provides shock and recoil absorption when a force or impact is applied to the device 2 by movement of the drive bar 6. Preferably, the spring 42 has stiffness suitable for reducing the shock or recoil of the device without absorbing an excessive amount of the impact that is intended to be transferred to an attached end tip.

Figure 5:
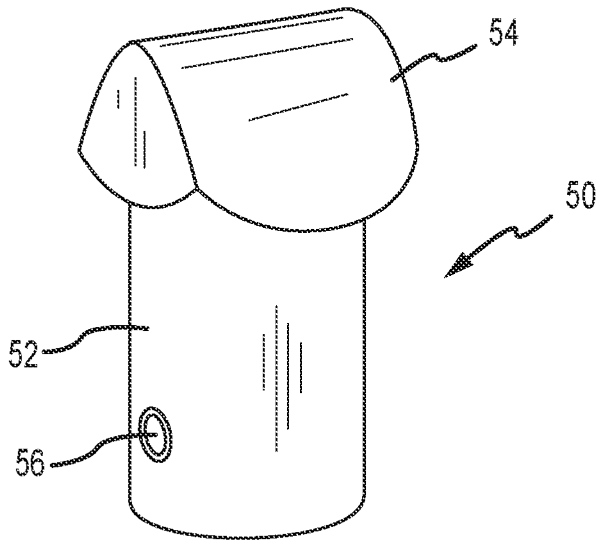
FIG. 5 is a perspective view of an end tip component of the slide hammer device according to one embodiment.
Figure 6:
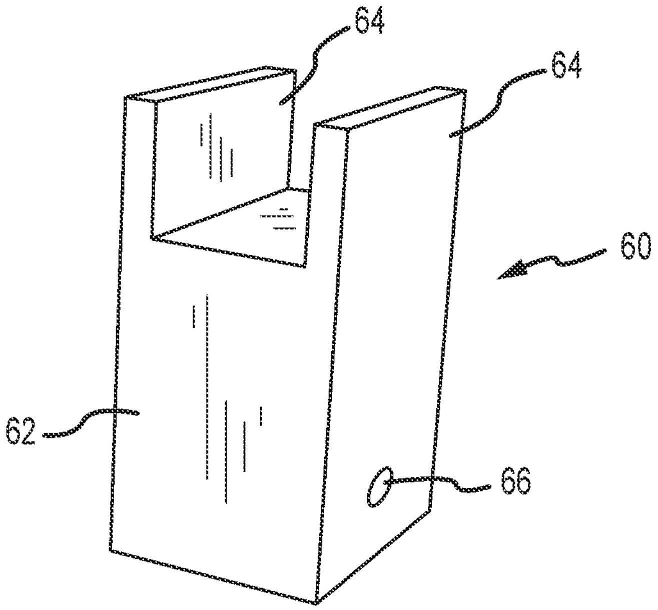
FIG. 6 is a perspective view of another end tip component of the slide hammer device according to another embodiment.

FIGS. 5-6 depict end tips according to various embodiments of the present invention. FIG. 5 depicts an end tip 50 that can be attached to the distal end 31 of the impact head 18. The end tip 50 comprises a tapered head 54 disposed on a substantially cylindrical shaft portion 52. The substantially cylindrical shaft portion 52 comprises at least one aperture 56 for selectively securing the end tip 50 to the impact head 18 as by a retaining pin (not shown). The tapered head 50 has a rounded distal end that extends substantially perpendicular to an axis of the shaft portion 52. The tapered head, when viewed from the side, has a substantially v-shaped configuration, however the distal end being rounded as shown and described.

FIG. 6 depicts an end tip 60 according to another embodiment wherein the end tip 60 includes a body 62 and spaced prongs 64. As shown, the prongs 64 are substantially planar and extend longitudinally in the direction of the body, which is also longitudinally aligned with the impact head 18 when attached thereto. The prongs 64 define a channel or gap between the prongs that can be used to engage a targeted object as described below.

Figure 7:
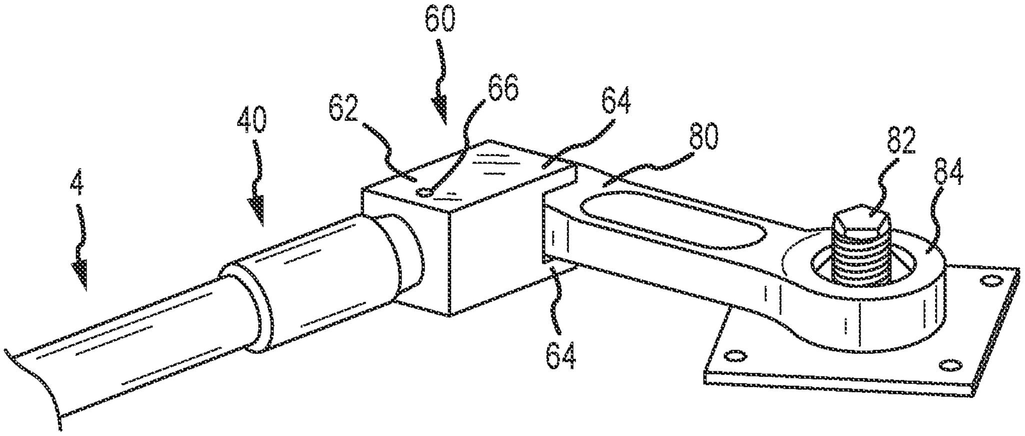
FIG. 7 is a perspective view of the slide hammer device with the end tip of FIG. 6 mounted thereto, and the end tip engaged with a targeted work piece in the form of a wrench used to tighten or loosen a nut, and the end tip provided as a mechanical force assist.

FIG. 7 is a perspective view of the slide hammer device with the end tip of FIG. 6 mounted thereto, and the end tip engaged with a targeted work piece in the form of a wrench used to tighten or loosen a nut, and the end tip provided as a mechanical force assist. More specifically, the end tip 60 engages the handle of a wrench 80, and the wrench 80 is used to tighten or loosen a nut threaded over a bolt 82. The wrench 80 is shown as a box-end wrench in which the box end 84 of the wrench 80 is placed over the bolt 82 and engaged with a nut (not shown) threaded over the bolt. As shown, the spaced prongs 62 are spaced apart a distance slightly greater than a width of the wrench handle that enables the end tip 60 to conveniently engage the wrench. A user can apply force to the wrench through the end tip by operating the slide hammer to generate a compression or hammering force by sliding the drive bar 6 forward or distally so that the enlarged end 22 of the drive bar 6 contacts the impact head 18, thereby causing the wrench to tighten or loosen the nut by rotation of the wrench in the corresponding direction.

Figure 8:
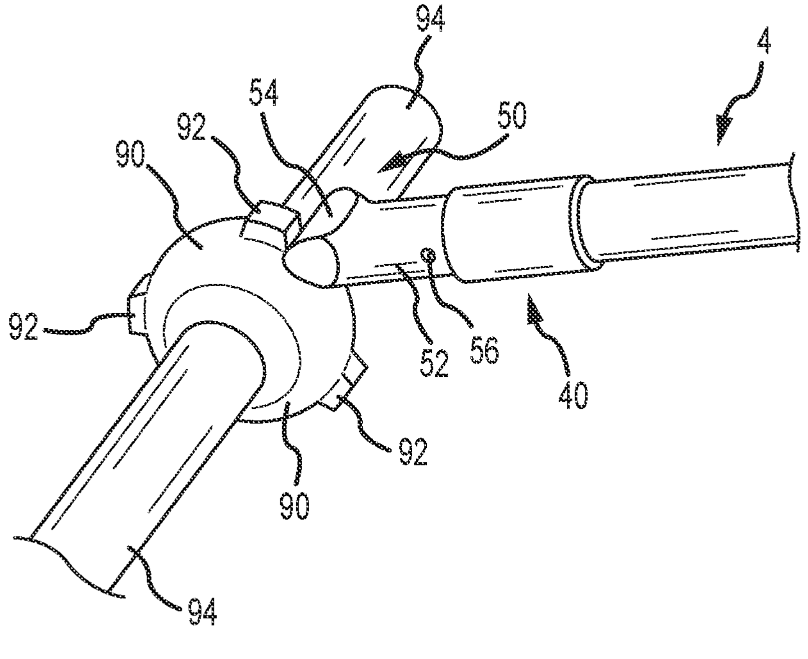
FIG. 8 is a perspective view of the slide hammer device with the end tip of FIG. 5 mounted thereto, and the end tip engaged with a targeted work piece in the form of a threaded pipe union interconnecting two sections of pipe, in which the slide hammer device is used to rotate the pipe union to join or disconnect the sections of pipe.

FIG. 8 is a perspective view of the slide hammer device with the end tip of FIG. 5 mounted thereto, and the end tip engaged with a targeted work piece in the form of a threaded pipe union interconnecting two sections of pipe, in which the slide hammer device is used to rotate the pipe union to join or disconnect the sections of pipe. More specifically, the end tip 50 engages a crease or channel located between the studs or protrusions 92 of a pipe union 90. Conventionally, a pipe union 90 is used to interconnect two sections of pipe 94 as shown. For pipe unions used to interconnect large sections of pipe, such as pipes used for conveying petroleum products or natural gas, the pipe unions incorporate the protrusions 92 in order to assist with rotating the pipe union. However, oftentimes these pipe unions can become seized over the sections of pipe, and significant force must be used to rotate the unions. The tip 50 is especially adapted for engaging the creases or channels located between the body of the pipe union 90 and the protrusions 90. The shape of the tapered head fits within the channels of various different sized pipe unions. A user can apply force to the pipe union through the end tip by operating the slide hammer to generate a compression or hammering force by sliding the drive bar 6 forward or distally so that the enlarged end 22 of the drive bar 6 contacts the impact head 18. In this manner, the pipe union 90 can be rotated to join or disconnect the sections of pipe 94 by rotating the pipe union in the corresponding direction.

According to a method of invention, an end tip is secured to the distal end of the impact head 18. The end tip is attached to a targeted object in which it is desired to place a tension or withdrawing force upon the object. For example, the targeted object could be an object seized or jammed within a chamber that must be removed, and the chamber has only one open end that requires the object to be removed by a force directed in tension or extraction. Once the end tip is secured to the object, a user withdraws the drive bar 6 at a desired speed and force so that the shelf 24 of the enlarged drive bar end 22 makes contact with the distal edge 21 of the proximal stop 20. Upon impact of the moving drive bar 6 against the stop 20, a tension or withdrawal force is transmitted to the targeted object. The user can selectively repeat the striking action of the drive bar end 22 against the stop 20 by cycling the drive bar forward and then in a reverse withdrawn direction for another contact or strike of the drive bar end 22 against the stop 20. The repeated striking action can be conducted until sufficient forces have been applied to remove or otherwise dislodge the targeted object.

One example of an end tip that can be used for attaching the end tip to a targeted object for purposes of placing a tension force against the object includes an end tip with a male or female threaded portion that enables it to be threadably attached to the targeted object that has a complementary threaded portion. Another example includes an end tip with an opening to receive a securing pin that can be placed through a complementary opening in the targeted object so that the pin joins the end tip and object. Yet another example of an end tip that can be used to attach the end tip to a targeted object includes an end tip having a section of chain or cable with one end anchored to the end tip and a free end of the chain/cable that can be wrapped around or through the targeted object. In this latter example, the chain/cable could be secured to the targeted object by means of a conventional padlock or key lock, a chain/cable clamp, or by other means. One feature associated with an end tip used for generating tension or withdrawal forces is that the end tip preferably is maintained in a position to minimize movement between the end tip and the targeted object. In this way, the tension forces generated by the device will be more fully and directly transferred to the targeted object. In the event a chain/cable arrangement is used for securing the end tip to the targeted object, it is desirable to ensure the chain/cable is tightly secured to the targeted object with a minimum of play or "slop" to avoid loss of transferred forces when the device is operated.

While various embodiments of the slide hammer have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A slide hammer comprising:

a guide sleeve having a distal end and a proximal end, and an inner surface defining a longitudinal passageway therein, the guide sleeve further comprising a first delimiting member located at the distal end and a second delimiting member located at the proximal end;

a hand guard connected to said proximal end of said guide sleeve;

a locking pin cooperating with said hand guard;

an impact head secured to the distal end of the guide sleeve;

a drive bar slidably secured within the longitudinal passageway of the guide sleeve, the drive bar comprising a proximal end, a recess formed on said drive bar, and a distal end, the proximal end comprising an extension which extends beyond the proximal end of said guide sleeve;

wherein contact between the impact head and the first delimiting member defines a position of maximum insertion of the drive bar within the guide sleeve and contact between the impact head and the second delimiting member defines a maximum withdrawn position of the drive bar from within the guide sleeve; and wherein the locking pin is selectively released to engage the recess to thereby lock the drive bar in place to prevent movement of the drive bar within the guide sleeve.

2. The slide hammer of claim 1, wherein the first delimiting member comprises an inwardly extending annular flange located at the distal end of the guide sleeve.

3. The slide hammer of claim 1, wherein the second delimiting member comprises a ring or bushing located within the proximal end the guide sleeve.

4. The slide hammer of claim 3, wherein the second delimiting member has an inner diameter that is less than a diameter of the impact head.

5. The slide hammer of claim 1, further including:

a removable tip attached to a distal end of the impact head.

6. A method of generating a tension force by a slide hammer device against a targeted object, comprising:

providing a slide hammer device including (i) a guide sleeve having a distal end and a proximal end, and an inner surface defining a longitudinal passageway therein, the guide sleeve further comprising a first delimiting member located within the guide sleeve at the distal end and a second delimiting member located within the guide sleeve at the proximal end; (ii) an impact head secured to the distal end of the guide sleeve; (iii) a monolithic drive bar slidably secured within the longitudinal passageway of the guide sleeve, the drive bar comprising a shaft portion, a user proximal end, a distal end, and a recess formed on said drive bar; (iv) providing an end tip secured to a distal end of the impact head; (v) providing a hand guard connected to said proximal end of said guide sleeve and a locking pin cooperating with said hand guard;

securing the end tip to a targeted object upon which the tension force is to be applied by the device;

sliding the drive bar within the guide sleeve in a rearward direction, while the guide sleeve remains stationary, so that an enlarged portion of the drive bar contacts the second delimiting member within the guide sleeve;

wherein contact between the enlarged portion of the drive bar against the second delimiting member generates a tension force against the targeted object; and releasing the locking pin to engage the recess to thereby lock the drive bar in place to prevent further movement of the drive bar within the guide sleeve.

7. The method, as claimed in claim 6, wherein:

said second delimiting member includes a cylindrical shaped bushing frictionally fit within said guide sleeve and wherein said shelf of said drive bar contacts a forward edge of said cylindrical shaped bushing when said drive bar is slid in the rearward direction.

* * * * *